(12) United States Patent
Gallet

(10) Patent No.: US 12,092,020 B2
(45) Date of Patent: Sep. 17, 2024

(54) ARCHITECTURE OF A TURBOMACHINE WITH COUNTER-ROTATING TURBINE

(71) Applicant: SAFRAN AIRCRAFT ENGINES, Paris (FR)

(72) Inventor: Francois Gallet, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 39 days.

(21) Appl. No.: 17/594,626

(22) PCT Filed: Apr. 2, 2020

(86) PCT No.: PCT/EP2020/059453
§ 371 (c)(1),
(2) Date: Oct. 25, 2021

(87) PCT Pub. No.: WO2020/221548
PCT Pub. Date: Nov. 5, 2020

(65) Prior Publication Data
US 2022/0195917 A1  Jun. 23, 2022

(30) Foreign Application Priority Data
Apr. 30, 2019 (FR) ...................................... 1904590

(51) Int. Cl.
*F02C 3/067* (2006.01)
*F02C 7/06* (2006.01)
*F04D 19/02* (2006.01)

(52) U.S. Cl.
CPC .............. *F02C 3/067* (2013.01); *F02C 7/06* (2013.01); *F04D 19/024* (2013.01);
(Continued)

(58) Field of Classification Search
CPC .......... F02C 3/067; F02C 7/06; F04D 19/024; F02K 3/072; F05D 2240/54; F05D 2240/60; F05D 2260/98
See application file for complete search history.

(56) References Cited

U.S. PATENT DOCUMENTS 5,079,916 A * 1/1992 Johnson .................. F02K 3/072
416/129
5,307,622 A * 5/1994 Ciokajlo ................. F02C 3/067
416/128
(Continued)

FOREIGN PATENT DOCUMENTS

DE 3728437 A1 3/1988
FR 2874238 A1 2/2006
(Continued)

OTHER PUBLICATIONS

French Search Report issued in FR1904590 on Jan. 16, 2020 (7 pages).
(Continued)

*Primary Examiner* — Brian P Wolcott
*Assistant Examiner* — Jesse M Prager
(74) *Attorney, Agent, or Firm* — Bookoff McAndrews, PLLC

(57) ABSTRACT

Counter-rotating turbine of a turbomachine extending about an axis of rotation and comprising an inner rotor rotating about the axis of rotation, and comprising at least one inner movable blade rotatably supported by a first shaft, an outer rotor rotating about the axis of rotation in a direction opposite to the inner rotor, and comprising at least one outer movable blade rotatably supported by a second shaft coaxial with the first shaft, the first and second shafts extending axially from upstream to downstream of the turbine, wherein the first shaft is guided in rotation by a first bearing disposed between the first shaft and an upstream casing of the turbine, (Continued)

and the second shaft is guided in rotation by a second bearing disposed between the second shaft and said upstream casing of the turbine.

9 Claims, 2 Drawing Sheets

(52) U.S. Cl.
CPC ...... *F05D 2240/54* (2013.01); *F05D 2240/60* (2013.01); *F05D 2260/98* (2013.01)

(56) References Cited

U.S. PATENT DOCUMENTS

| 2006/0093466 | A1* | 5/2006 | Seda | F16C 17/18 |
| | | | | 415/68 |
| 2019/0017382 | A1* | 1/2019 | Clements | F02C 7/36 |
| 2019/0085723 | A1* | 3/2019 | Pankaj | F02C 3/04 |

FOREIGN PATENT DOCUMENTS

| GB | 2129502 A | * | 5/1984 | ........... B64C 11/308 |
| GB | 2155110 A | | 9/1985 | |

OTHER PUBLICATIONS

International Search Report issued in PCT/EP2020/059453 on Jun. 15, 2020 (2 pages).

* cited by examiner

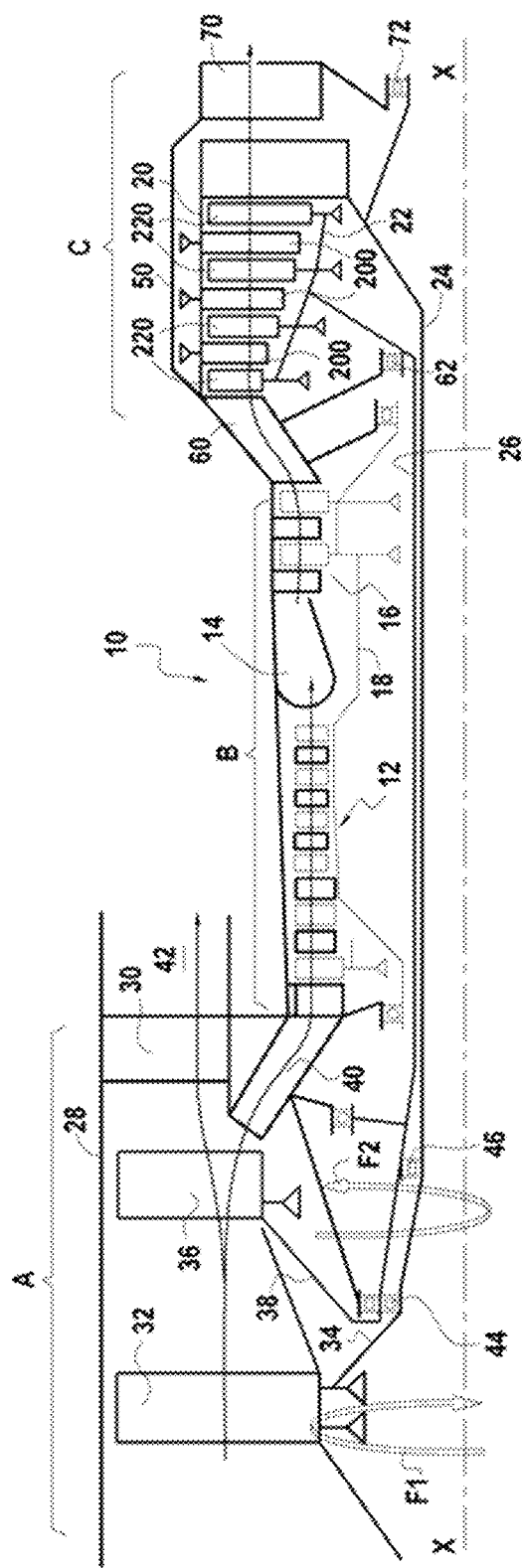
[Fig. 1]

[Fig. 2]
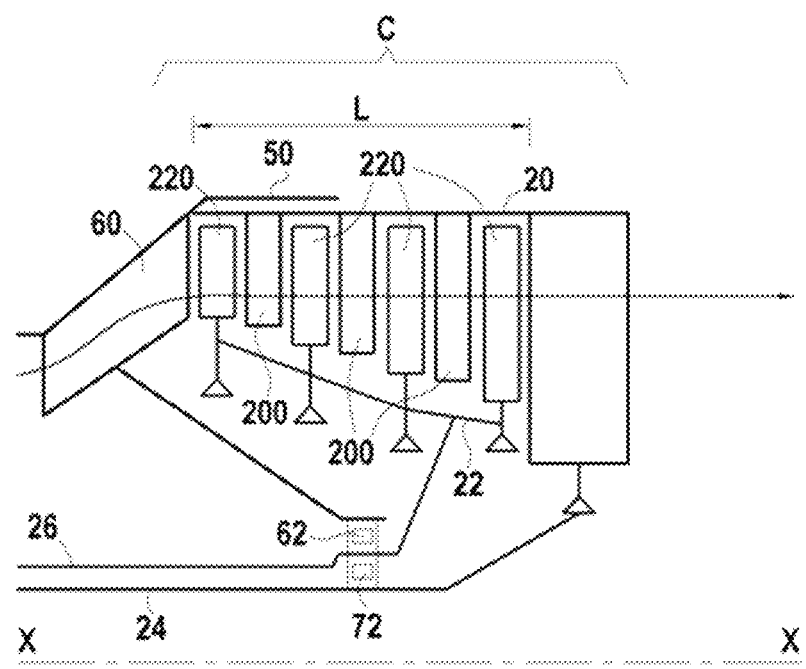

ARCHITECTURE OF A TURBOMACHINE WITH COUNTER-ROTATING TURBINE

CROSS REFERENCE TO RELATED APPLICATIONS

This application is a National Stage Application of International Application No. PCT/EP2021/067639, filed on Jun. 28, 2021, now published as WO/2022/002826, which claims priority to European Application No. 20315330.9, filed on Jun. 30, 2020, the entire contents of which is incorporated herein by reference.

TECHNICAL FIELD

The present disclosure relates to the field of turbomachines. More specifically, the present disclosure relates to a counter-rotating turbine of a turbomachine, and a turbomachine comprising such a turbine.

BACKGROUND

An aircraft turbomachine generally comprises, from upstream to downstream in the direction of flow of the gases, a fan, a low-pressure compressor, a high-pressure compressor, a combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

In order to improve the engine efficiency, the aircraft turbomachines can be equipped with a counter-rotating turbine, instead of the low-pressure turbine. The counter-rotating turbine comprises an inner rotor, called fast rotor, connected to a first turbine shaft, and configured to rotate in a first direction of rotation, and an outer rotor, called slow rotor, connected to a second turbine shaft, and configured to rotate in a second direction of rotation, opposite to the first direction of rotation. The blades of the first rotor are interposed with the blades of the second rotor.

In known manner, the first turbine shaft is in particular centered and guided by a bearing mounted between the first shaft and an upstream turbine casing, or TVF (Turbine Vane Frame) casing, disposed upstream of the counter-rotating turbine, and the second turbine shaft is centered and guided by another bearing mounted between the second shaft and a downstream turbine casing or TRF (Turbine Rear Frame) casing, disposed downstream of the counter-rotating turbine.

However, this architecture has some drawbacks. In particular, the position of the bearing guiding the second shaft forces the latter to be very long, and is therefore subject to significant bending stresses. However, a significant bending of the second shaft relative to the first shaft can cause the appearance of clearances between the rotors, or the modification of already existing clearances. Moreover, the bearings of the first and second shafts being carried by different structures (upstream casing for the first shaft and downstream casing for the second shaft), the local deformations of these casings, caused by expansions, distortions or gyroscopic effects, generate different displacements of these shafts, and therefore the appearance of clearances between different portions of the rotors. For example, relative displacements between the first and the second rotor can cause the appearance of a clearance between the blades of the first rotor and the abradable track of the second rotor. Such clearances, caused by differential deformations of the rotors, can lead to leaks which affect the performances of the turbomachine.

In addition, the known architectures of these counter-rotating turbines involve an outer rotor containment in an external casing, and therefore high temperatures of the latter. Indeed, the presence of such an external casing is necessary to carry both the upstream casing and the downstream casing of the turbine, and thus ensure the structural link between the upstream casing and the downstream casing. The fact that this outer rotor is incased in an external casing limits the possibility of installing a cooling device for this rotor, or of installing measuring means for the blades, such as endoscopes. There is therefore a need for a counter-rotating turbine architecture making it possible to overcome at least part of the drawbacks above.

SUMMARY

The present disclosure relates to a counter-rotating turbine of a turbomachine, extending about an axis of rotation and comprising:
 an inner rotor configured to rotate about the axis of rotation, and comprising at least one inner movable blade rotatably supported by a first shaft,
 an outer rotor configured to rotate about the axis of rotation in a direction opposite to the inner rotor, and comprising at least one outer movable blade rotatably supported by a second shaft coaxial with the first shaft, the first and second shafts extending axially from upstream to downstream of the turbine, in which the first shaft is guided in rotation by a first bearing disposed between the first shaft and an upstream casing of the turbine, and the second shaft is guided in rotation by a second bearing disposed between the second shaft and said upstream casing of the turbine.

In the present disclosure, the terms "inner" and "outer", and the terms "internal" and "external" and their derivatives are considered according to the radial direction of the turbine. Likewise, the terms "upstream" and "downstream" are considered according to the direction of flow of the gases in the turbomachine, along the axis of rotation.

The first and second shafts can be tubular, and are coaxial, while extending along the axis of rotation. By "disposed between the first shaft and an upstream casing of the turbine", it is understood that the first bearing, and therefore the first shaft, are carried by the upstream casing, an outer end or outer ring of the first bearing being fixed to the upstream casing, an inner end or inner ring of the first bearing being fixed to the first shaft.

By "disposed between the second shaft and said upstream casing of the turbine", it is understood that the second bearing, and therefore the second shaft, are carried, possibly indirectly, by the upstream casing. In other words, the stresses exerted by the second shaft, for example the bending stresses, are transmitted to the upstream casing, without the outer end or outer ring of the second bearing being necessarily in direct contact with the upstream casing. By "possibly indirectly", it is understood that another element can be interposed between the upstream casing and the second bearing, this element possibly being for example the first shaft and the first bearing. In addition, the inner end or inner ring of the second bearing is fixed to the second shaft.

Thus, the first and second bearings are both ultimately carried by the same casing that is to say by the upstream casing. Consequently, the deformations due for example to an expansion of the upstream casing during the operation of the turbine are transmitted to each of the two bearings jointly, such that these displace simultaneously each other. The absence of differential displacement of one casing relative to the other thus limits the risk of appearance or modifications of clearances between different portions of the rotors, caused for example by relative displacements between the first and the second rotor. The limitation of these clearances caused by differential deformations of the rotors thus allows limiting the risk of appearance of leaks, and improving the efficiency and performances of the turbomachine.

Moreover, the bearings being both carried by the upstream casing, the downstream casing generally present on the turbines according to the state of the art, is no longer necessary to carry the second bearing, and can consequently be deleted. This allows minimizing the mass of the turbine.

In some embodiments, the at least one inner movable blade is rotatably supported by a portion of the first shaft cantilevered from the first bearing, and the at least one outer movable blade is rotatably supported by a portion of the second shaft cantilevered from the second bearing.

By "cantilevered", it is understood that the inner blades are carried by the first shaft at a position located downstream of the first bearing, and the outer blades are carried by the second shaft at a position located downstream of the second bearing. In other words, given that the two bearings are carried by the upstream casing, the support of the inner and outer rotors by the first and the second shaft is made downstream of the two bearings, along the axis of rotation.

In some embodiments, the second bearing is disposed between the second shaft and the first shaft.

In other words, an outer end of the second bearing is fixed to the first shaft, and an inner end of the first bearing is fixed to the first shaft. In other words, the first and the second bearing are disposed and fixed on either side of the wall of the first shaft, and are both carried by the upstream casing.

In some embodiments, the first and second bearings are disposed substantially in line with each other along the axis of rotation.

In other words, the first and second bearings are disposed substantially on the same radial plane normal to the axis of rotation. Thus, deformation stresses coming from the upstream casing are more efficiently transmitted from the first bearing to the second bearing, the path of the stresses being minimized. Consequently, a displacement, for example a bending, of the first shaft will generate a substantially identical displacement of the second shaft. The risks of differential displacements between the inner rotor and the outer rotor are thus further limited.

In some embodiments, the first and second bearings are disposed substantially at a median plane of the turbine along the axis of rotation.

The median plane, or geometric center, designates the center, along the axis of rotation, of the total length of the turbine. According to this configuration, the turbine is less sensitive to gyroscopic effects. In other words, this position of the first and second bearings allows ensuring that the bending movements of the first and second shafts, resulting in rotations of the rotors about an axis perpendicular to the axis of rotation of the turbine, will generate mainly axial displacements at the tops of the blades, and little radial displacements, and consequently little appearance or modifications of the clearances between the inner and outer rotors.

In addition, the second bearing being disposed at a median plane of the turbine and being carried by the upstream casing, and no longer by the downstream casing, it is thus possible to reduce the length of the second shaft. The bending stresses to which the second shaft is subjected are therefore minimized, thus further limiting the appearance of clearances between the rotors, or the modification of already existing clearances.

In some embodiments, the turbine comprises an outer casing at least partially surrounding the outer rotor, the outer casing extending axially from an upstream end of the turbine, to a position disposed upstream of a downstream end of the turbine.

In some embodiments, the outer casing extends axially from the upstream end of the turbine over a length of less than 50%, preferably less than 30%, more preferably less than 15% of the length of the turbine.

Taking into account the fact that the first and the second bearing are both carried by the upstream casing, the downstream casing generally present on the turbines according to the state of the art, is no longer necessary to carry the second bearing, and can consequently be deleted. It is moreover no longer necessary to have an outer casing to carry the downstream casing and surrounding the outer rotor over the entire length thereof. Thus, the downstream portion of the outer rotor is no longer incased. Consequently, a cooling device can be disposed to directly cool this downstream portion, and measuring devices such as endoscopes can be more easily set up. It is also possible to house sealing devices, such as labyrinth seals or segmented radial seals, between the rotor and stator, allowing limiting the leaks of the turbine.

In some embodiments, the turbine comprises a lubrication device configured to convey and discharge a lubricating fluid through the upstream casing, and to lubricate at least the first and second bearings via the lubricating fluid.

The first and second bearings being adjacent to each other, it is thus possible to simplify the lubrication device, in particular by shortening the latter. Indeed, only one lubrication circuit is necessary to jointly lubricate the first and the second bearing. To do so, the first and second shafts may include orifices allowing the flow of the lubricating fluid between the first and the second bearing.

In some embodiments, the first and second bearings are ball bearings.

In some embodiments, the first and second bearings are roller bearings. The roller bearings allow countering the differential expansions more effectively.

The present disclosure also relates to a turbomachine comprising the turbine according to any one of the preceding embodiments.

BRIEF DESCRIPTION OF THE DRAWINGS

The invention and its advantages will be better understood upon reading the detailed description given below of different embodiments of the invention given by way of non-limiting examples. This description refers to the pages of appended figures, on which:

FIG. 1 represents a general view illustrating the operating principle of a turbomachine with counter-rotating fans according to the state of the art, FIG. 2 represents a schematic view of a low-pressure turbine according to the present disclosure.

DETAILED DESCRIPTION

Referring to FIG. 1, a turbomachine 10 with counter-rotating fans includes a longitudinal axis X-X. From upstream to downstream along the direction of flow of the gases in the turbomachine (represented by the black arrow), the turbomachine 10 essentially comprises three parts: an upstream module A (or fan section), an intermediate module B (or high-pressure body) and a downstream module C (or low-pressure turbine section).

The three parts A, B and C of the turbomachine are modular, that is to say they each form a single assembly and can each be replaced by being separated from the other parts of the turbomachine.

In a manner well known per se, the high-pressure body B comprises a gas generator for producing combustion gases. This gas generator comprises a compressor 12, a combustion chamber 14 and a high-pressure turbine 16.

The air compressed by the compressor 12 is mixed with the fuel in the combustion chamber 14 before being burned therein. The thus produced combustion gases drive the movable blades of the high-pressure turbine 16 which itself drives the compressor 12 via a high-pressure shaft 18. The circulation of the combustion gases in the turbomachine 10 takes place axially from upstream to downstream.

The low-pressure turbine section C comprises a first annular rotor, or outer rotor 20. This outer rotor 20 comprises a row of outer movable blades 200 of the turbine which extend radially inwardly and which are axially spaced apart from each other.

The low-pressure turbine section C also comprises a second annular rotor or inner rotor 22. This inner rotor 22 comprises a row of inner movable blades 220 of the turbine which extend radially outwardly and which are axially spaced apart from each other. The turbine blades 200, 220 of the inner and outer rotors 20, 22 are disposed alternately relative to each other such that the inner and outer rotors 20, 22 are nested within each other.

The movable turbine blades 200 of the outer rotor 20 are rotatably supported by a first low-pressure shaft 24. Likewise, the movable turbine blades 220 of the inner rotor 22 are rotatably supported by a second low-pressure shaft. 26 disposed coaxially about the first shaft 24. The low-pressure shafts 24, 26 extend axially from upstream to downstream of the axis X of the turbomachine. The inner and outer rotors 20, 22 are surrounded by an outer casing 50.

The combustion gases coming from the high-pressure body B pass through the low-pressure turbine section C. These combustion gases therefore rotatably drive the turbine blades 200, 220 of the inner and outer rotors 20, 22 in opposite directions. Thus, the first and second low-pressure shafts 24, 26 also rotate in a counter-rotating manner.

The fan section A is located upstream of the turbomachine 10. A cowl 28 annularly surrounds this fan section A. The cowl 28 is supported by spacers 30 which extend radially inwardly of the turbomachine.

The fan section A includes a first row of fan blades 32 mounted on an upstream fan shaft 34 which is connected to an upstream end of the first low-pressure shaft 24.

The fan section A also includes a second row of fan blades 36 which are axially spaced apart downstream of the first row of fan blades 32 and mounted on a rear fan shaft 38 connected to one upstream end of the second low-pressure shaft 26.

The first and second rows of fan blades 32, 36 thus rotate in opposite directions which are represented, by way of example, by the respective arrows F1 and F2. This configuration with counter-rotating fans thus gives the turbomachine high efficiency for a relatively low specific consumption.

The fan blades 32, 36 extend radially from the upstream 34 and downstream 38 fan shafts practically to the cowl 28.

They are disposed in the air circulation passage supplying both the primary flowpath 40 leading to the compressor 12 of the high-pressure body B and the secondary bypass flowpath 42.

At its upstream end, the first low-pressure shaft 24 rotatably supports the second low-pressure shaft 26 via a first rolling bearing 44 and a second rolling bearing 46 disposed downstream of the first rolling bearing.

The first rolling bearing 44 is of the ball type to withstand the axial loads, while the second rolling bearing 46 is of the roller type to withstand the radial loads of the turbomachine.

At its downstream end, the first low-pressure shaft 24 is centered and guided by a bearing 72 mounted between the first shaft 24 and a downstream casing 70 (or TRF casing, or exhaust casing) of the turbine. Furthermore, at its downstream end, the second low-pressure shaft 26 is centered and guided by a bearing 62 mounted between the second shaft 26 and an upstream casing 60 (or TVF casing) of the turbine. The bearings 62 and 72 can be roller bearings or ball bearings.

The remainder of the description describes, with reference to FIG. 2, an arrangement of the bearings of the counter-rotating turbine of the present disclosure, in particular of the low-pressure turbine C of the turbomachine 10. However, this embodiment is not limited to this low-pressure turbine, and can be adapted to other elements of the turbomachine, for example the high-pressure turbine.

According to this embodiment, the bearings 62 and 72 of the first and second low-pressure shafts 24, 26 are displaced axially along the axis of rotation X, relative to their position described with reference to FIG. 1. More specifically, the bearing 62 is always mounted between the second shaft 26 and the upstream casing 60 of the turbine. However, according to this configuration, the bearing 72 is mounted between the first shaft 24 and the upstream casing 60 of the turbine as well. In other words, the bearings 62 and 72 are both carried by the same upstream casing 60.

Particularly, the bearing 72 is disposed between the first shaft 24 and the second shaft 26. The bearing 72 is therefore an inter-shaft bearing, in which its outer end is fixed to the second shaft 26 rotating in one direction, and its inner end is fixed to the first shaft 24 rotating in a direction opposite to the first shaft 24.

In addition, the bearings 62 and 72 can be disposed in line with each other, that is to say, be substantially aligned with each other along a radial direction. In other words, they can be disposed substantially at the same axial position, along the axis X. Preferably, this position corresponds to a geometric center of the turbine C. More specifically, when the turbine C extends axially over a length L between the blade located furthest upstream along the axis X, and the blade located furthest downstream, the bearings 62 and 72 are disposed at a distance substantially equal to L/2 from the blade located furthest upstream, along the axis X. In the example of FIG. 2, the inner rotor 22 comprises four blades 220, and the outer rotor 20 comprises three blades 200 disposed between the inner blades 220. Consequently, the bearings 62 and 72 are disposed at substantially the same axial position as the central blade 200 of the inner rotor 20.

According to this configuration, the first shaft 24 is shorter than according to the configuration presented with reference to FIG. 1. Thus, the bending stresses to which the first shaft 24 is subjected are minimized.

The bearings 62 and 72 being both carried by the upstream casing 60, the downstream casing 70 is no longer necessary to carry the bearing 72, and can consequently be omitted, in order to minimize the mass of the turbine C.

Likewise, unlike the turbine described with reference to FIG. 1, the outer casing 50 extends axially only over a portion less than 50%, preferably less than 30%, more preferably less than 15% of the length L of the turbine. Thus, the downstream portion of the outer rotor 20 is no longer uncased by the outer casing 50. The temperatures reached by the outer rotor 20 will therefore be lower than in a configuration in which the latter is entirely surrounded by the outer casing 50, thus limiting the risk of breakdowns. Furthermore, a cooling device (not represented) can be more easily set up in order to directly cool this downstream portion. In addition, this configuration makes the outer rotor more accessible. It is thus possible to inspect the latter more easily, through an endoscope for example, without having to dismantle the engine.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Consequently, the description and the drawings should be considered in an illustrative rather than a restrictive sense.

The invention claimed is:

1. A counter-rotating turbine of a turbomachine, extending about an axis of rotation, the counter-rotating turbine of the turbomachine including:
   an inner rotor configured to rotate about the axis of rotation, and comprising at least one inner movable blade rotatably supported by a first shaft,
   an outer rotor configured to rotate about the axis of rotation in a direction opposite to the inner rotor, and comprising at least one outer movable blade rotatably supported by a second shaft coaxial with the first shaft, the first and second shafts extending axially from upstream to downstream of the turbine,
   a turbine vane frame disposed upstream from the inner rotor and the outer rotor,
   wherein the first shaft is guided in rotation by a first bearing disposed between the first shaft and the turbine vane frame, and the second shaft is guided in rotation by a second bearing disposed between the second shaft and said turbine vane frame, the counter-rotating turbine comprising an outer casing only extending downstream from the turbine vane frame and at least partially surrounding a blade of the at least one inner movable blade and a blade of the at least one outer movable blade, the outer casing extending axially from an upstream end of the turbine, over a length of less than 50% of the length of the turbine, and the outer casing is radially outward of any other portion of the turbine, and wherein the counter-rotating turbine does not include a turbine rear frame casing.

2. The turbine according to claim 1, wherein the at least one inner movable blade is rotatably supported by a portion of the first shaft cantilevered from the first bearing, and the at least one outer movable blade is rotatably supported by a portion of the second shaft cantilevered from the second bearing.

3. The turbine according to claim 1, wherein the second bearing is disposed between the second shaft and the first shaft.

4. The turbine according to claim 1, wherein the first and second bearings are disposed on a same radial plane normal to the axis of rotation.

5. The turbine according to claim 1, wherein the first and second bearings are disposed at a median plane of the turbine according to the axis of rotation, such that the first and second bearings are disposed at a center of a length between the blade located furthest upstream along the axis of rotation, and the blade located furthest downstream along the axis of rotation.

6. The turbine according to claim 1, wherein the first and second bearings are roller bearings.

7. The turbine according to claim 1, wherein the outer casing extending axially from an upstream end of the turbine, over a length of less than 50%, so that a downstream portion of the outer rotor is no longer encased.

8. A turbomachine with counter-rotating fans extending about an axis of rotation and comprising a ducted fan with a cowl annularly surrounding a fan section which includes a first row of fan blades and a second row of fan blades, the first row of fan blades and the second row of fan blades rotating in opposite directions, the turbomachine further comprising a counter-rotating turbine driving the ducted fan, the counter-rotating turbine of the turbomachine including:
   an inner rotor configured to rotate about the axis of rotation, and comprising at least one inner movable blade rotatably supported by a first shaft,
   an outer rotor configured to rotate about the axis of rotation in a direction opposite to the inner rotor, and comprising at least one outer movable blade rotatably supported by a second shaft coaxial with the first shaft, the first and second shafts extending axially from upstream to downstream of the turbine,
   a turbine vane frame disposed upstream from the inner rotor and the outer rotor,
   wherein the first shaft is guided in rotation by a first bearing disposed between the first shaft and the turbine vane frame, and the second shaft is guided in rotation by a second bearing disposed between the second shaft and said turbine vane frame, the counter-rotating turbine comprising an outer casing only extending downstream from the turbine vane frame and at least partially surrounding a blade of the at least one inner movable blade and a blade of the at least one outer movable blade, the outer casing extending axially from an upstream end of the turbine, over a length of less than 50% of the length of the turbine, and wherein the outer casing radially outward of any other portion of the turbine.

9. A counter-rotating turbine of a turbomachine, extending about an axis of rotation, the counter-rotating turbine of the turbomachine including:
   an inner rotor configured to rotate about the axis of rotation, and comprising at least one inner movable blade rotatably supported by a first shaft,
   an outer rotor configured to rotate about the axis of rotation in a direction opposite to the inner rotor, and comprising at least one outer movable blade rotatably supported by a second shaft coaxial with the first shaft, the first and second shafts extending axially from upstream to downstream of the turbine,
   a turbine vane frame disposed upstream from the inner rotor and the outer rotor,
   wherein the first shaft is guided in rotation by a first bearing disposed between the first shaft and the turbine vane frame, and the second shaft is guided in rotation by a second bearing disposed between the second shaft and turbine vane frame, the counter-rotating turbine comprising an outer casing only extending downstream from the turbine vane frame and at least partially surrounding the outer rotor, the outer casing extending axially from an upstream end of the turbine, over a length of 15% to 50% of the length of the turbine, and the outer casing is radially outward of any other portion of the turbine, and wherein the counter-rotating turbine does not include a turbine rear frame casing.

* * * * *